(12) United States Patent
Long

(10) Patent No.: US 9,061,417 B2
(45) Date of Patent: Jun. 23, 2015

(54) ROBOT ARM MECHANISM

(75) Inventor: Bo Long, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 628 days.

(21) Appl. No.: 13/428,359

(22) Filed: Mar. 23, 2012

(65) Prior Publication Data

US 2013/0061708 A1   Mar. 14, 2013

(30) Foreign Application Priority Data

Sep. 8, 2011   (CN) .......................... 2011 1 0265558

(51) Int. Cl.
| | |
|---|---|
| *B25J 18/04* | (2006.01) |
| *B25J 9/10* | (2006.01) |
| *B25J 11/00* | (2006.01) |
| *B25J 18/00* | (2006.01) |

(52) U.S. Cl.
CPC ............ *B25J 9/104* (2013.01); *Y10T 74/20323* (2015.01); *B25J 11/005* (2013.01); *B25J 18/00* (2013.01)

(58) Field of Classification Search
CPC ..................................................... B25J 11/005
USPC ............................ 408/48; 74/490.04; 901/21
See application file for complete search history.

(56) References Cited

U.S. PATENT DOCUMENTS 3,499,353 A * 3/1970 Ewell .............................. 408/48
4,750,858 A * 6/1988 Nakashima et al. .......... 414/732

FOREIGN PATENT DOCUMENTS

| CN | 101436562 A | 5/2009 |
|---|---|---|
| CN | 201350629 Y | 11/2009 |
| CN | 102114630 A | 7/2011 |
| JP | 1-92087 A | 4/1989 |
| TW | M274168 | 9/2005 |

* cited by examiner

*Primary Examiner* — William Kelleher
*Assistant Examiner* — Terence Boes
(74) *Attorney, Agent, or Firm* — Novak Druce Connolly Bove + Quigg LLP

(57) ABSTRACT

A robot arm mechanism includes a drive arm, a support arm, a transmission assembly and three tool portions. The support arm is rotatably connected to the drive arm. The three tool portions are rotatably mounted on the support arm. The transmission assembly includes a first bevel gear, a second bevel gear and a transmission belt. The first bevel gear is mounted on the drive arm, the second bevel gear is mounted on the support arm and engages with the first bevel gear. The transmission belt is driven by the second bevel gear and imparts rotary motion to the plurality of tool portions simultaneously.

16 Claims, 5 Drawing Sheets

ROBOT ARM MECHANISM

BACKGROUND

1. Technical Field

The present disclosure relates to robot arm mechanisms, and more particularly, to a robot arm mechanism capable of functioning at multiple number of workstations synchronously.

2. Description of Related Art

Robot arm mechanisms are employed for labor saving purposes or under laboring in dangerous conditions. One robot arm mechanism includes a plurality of bevel gears and an elongated transmission shaft to transmit power. However, the existing robot arm mechanism has a complicated structure. When the robot arm mechanism needs to be repaired, the elongated transmission shaft is hard to detach from the robot arm mechanism. In addition, the elongated transmission shaft takes up a larger space within the robot arm mechanism, and is not suitable for working at multiple number of workstations.

BRIEF DESCRIPTION OF THE DRAWINGS

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
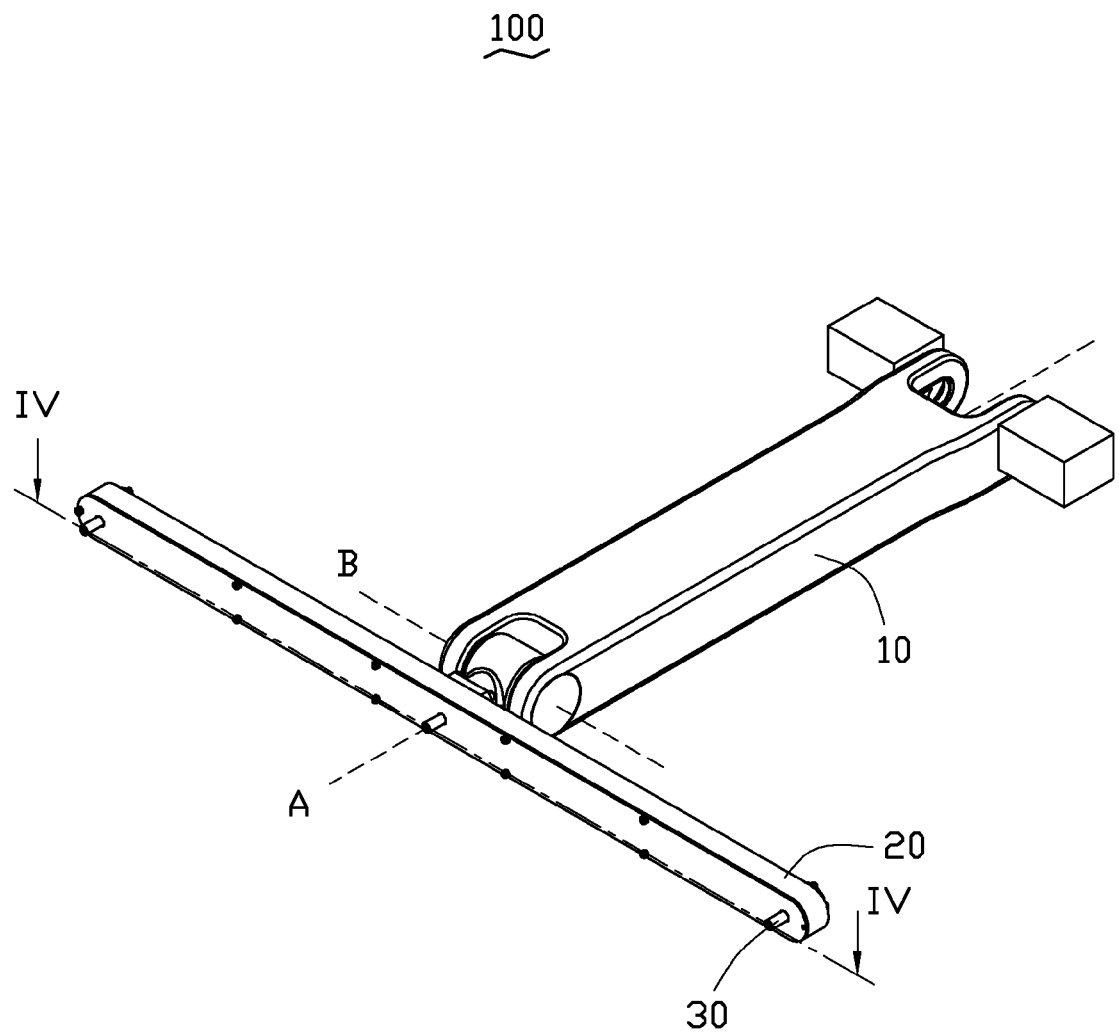
FIG. 1 is an isometric view of an embodiment of a robot arm mechanism.
Figure 2:
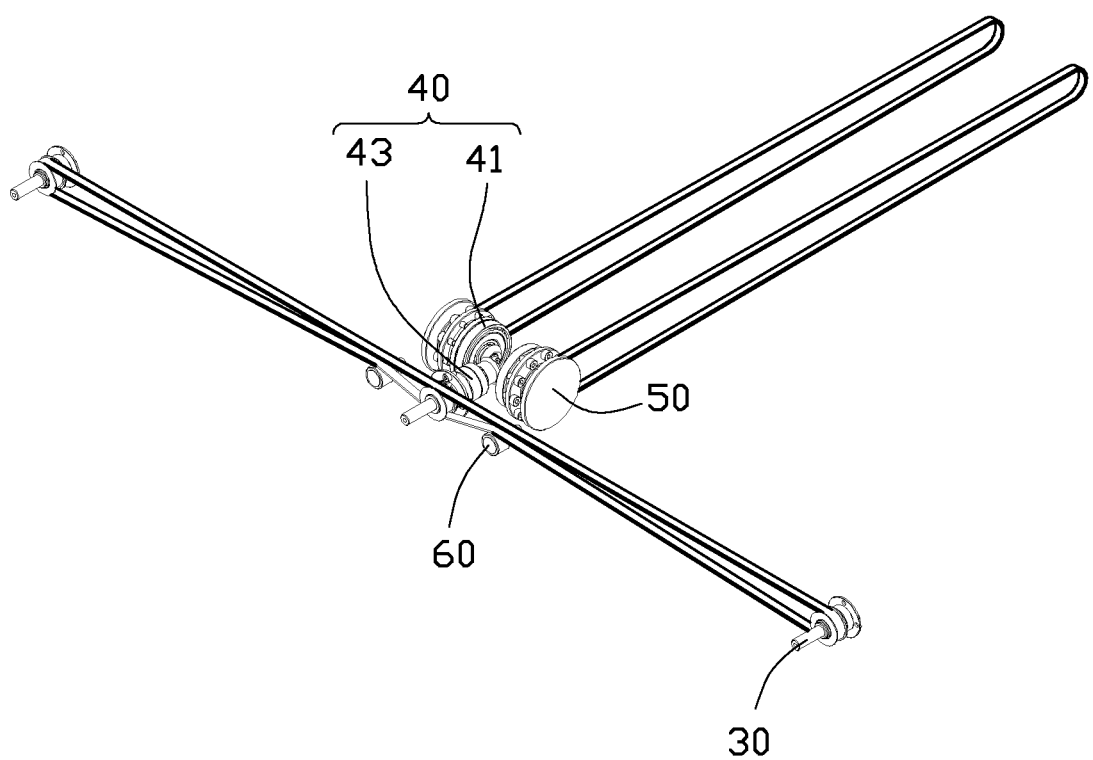
FIG. 2 is an isometric view of the interior of the robot arm mechanism of FIG. 1.

Referring to FIGS. 1 and 2, an embodiment of a robot arm mechanism 100 is substantially T-shaped and includes a drive arm 10, a support arm 20, three tool portions 30 mounted on the support arm 20, a transmission assembly 40, a pivotal assembly 50 and two tension assemblies 60. The drive arm 10 is rotatably connected to the support arm 20 and capable of rotating around a first axis A. The support arm 20 is capable of rotating along a second axis B which is perpendicular to the first axis A. The transmission assembly 40 is received within the drive arm 10, and thereby imparting rotary motion to the three tool portions 30. The pivotal assembly 50 is received within the drive arm 10 to drive the support arm 20 to rotate along the second axis B. The two tension assemblies 60 are oppositely received within the support arm 20. In one embodiment, the robot arm mechanism 100 is applied to or used for spray painting, and the three tool portions 30 are three paint injection heads. In another embodiment, the three tool portions 30 carry out drilling work.

Figure 3:
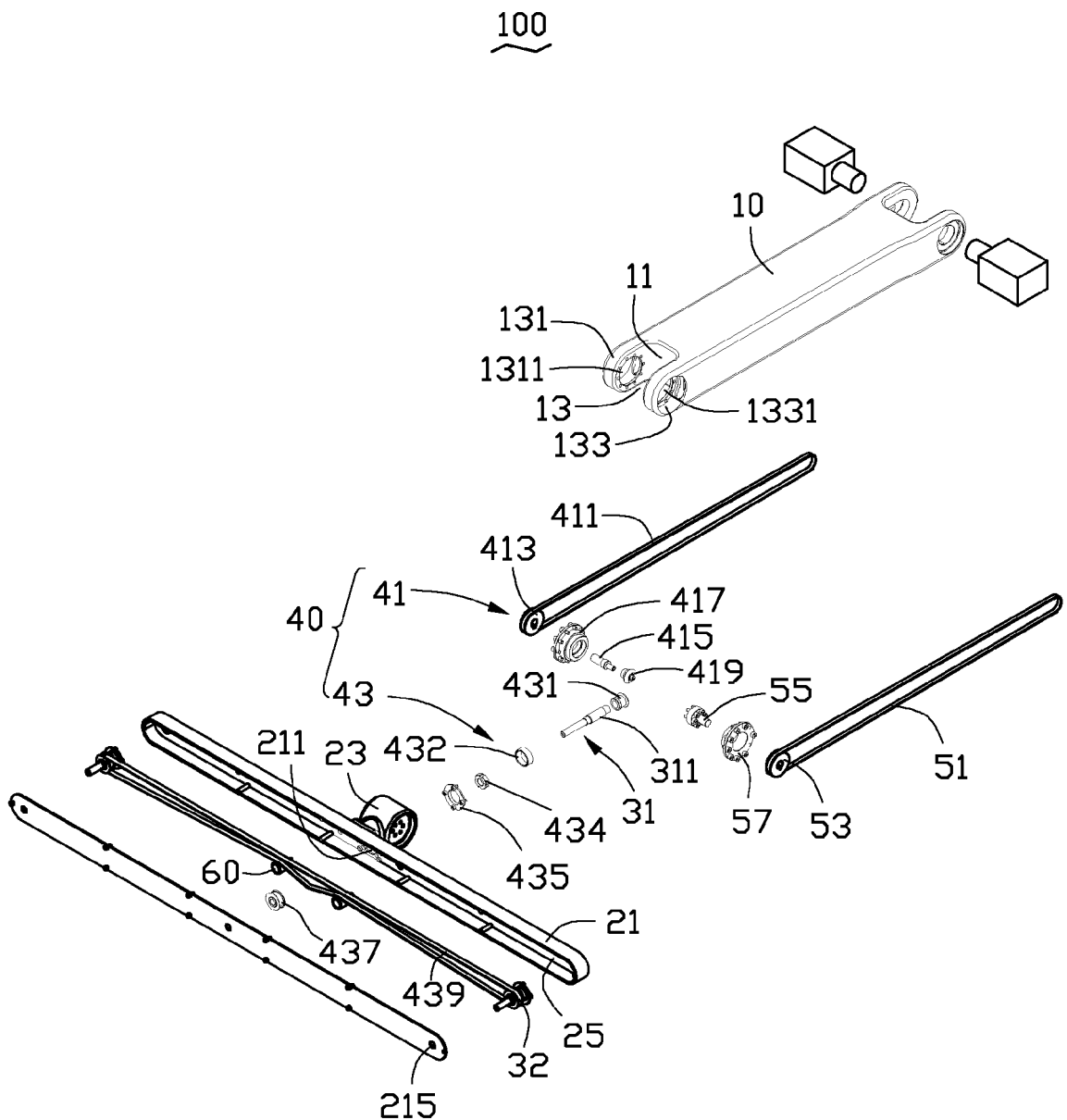
FIG. 3 is an exploded, isometric view of the robot arm mechanism of FIG. 1.
Figure 4:
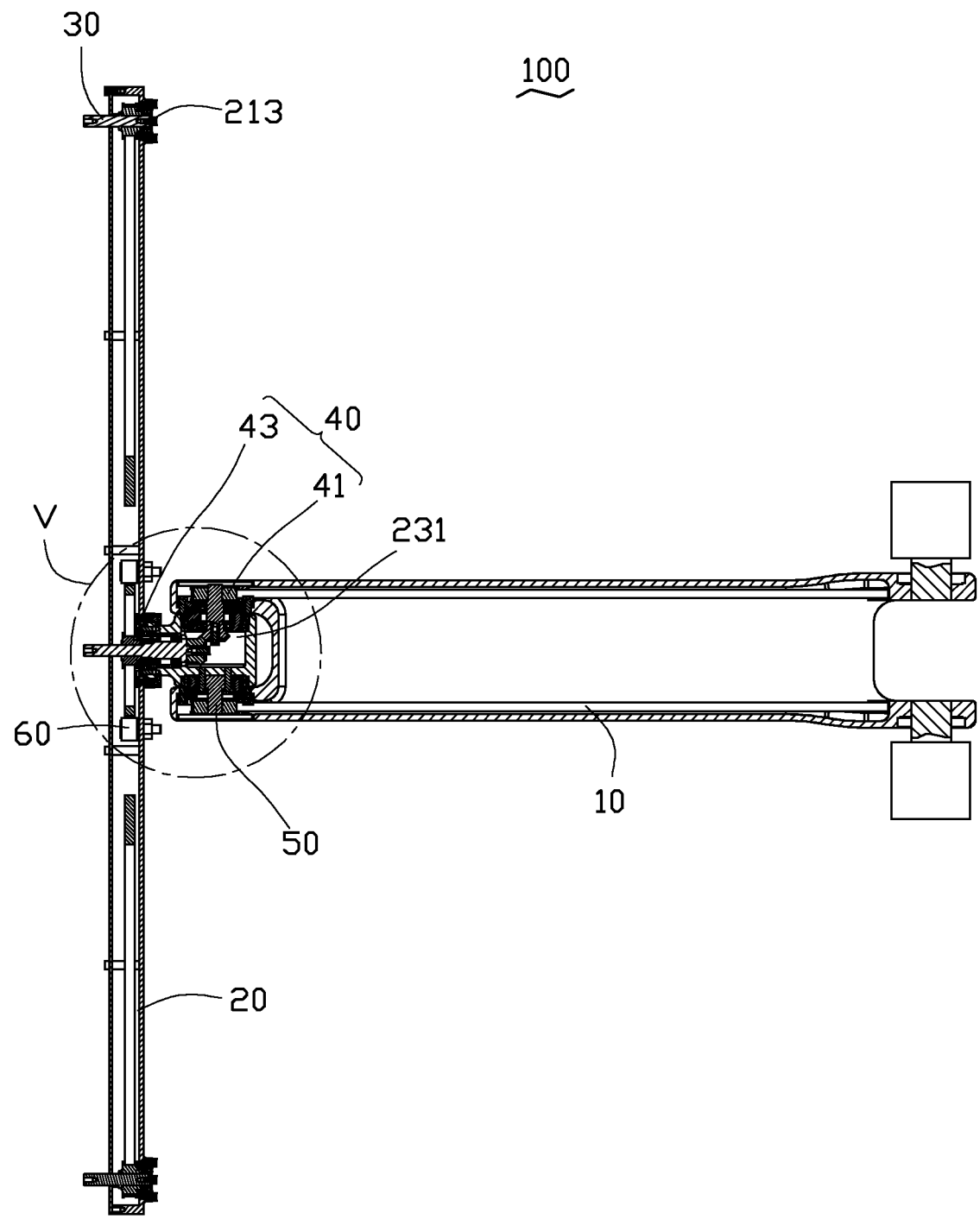
FIG. 4 is a cross-section of the robot arm mechanism of FIG. 1 taken along line IV-IV.

Also referring to FIGS. 3 and 4, the drive arm 10 is substantially rectangular and defines a first chamber 11 along a longitudinal direction thereof. The drive arm 10 defines a notch 13 at one end thereof communicating with the first chamber 11 and thereby forming a first pivotal portion 131 and a second pivotal portion 133 at opposite sides of the notch 13. The first pivotal portion 131 defines a through hole 1311 thereof, the second pivotal portion 133 defines a though hole 1331 thereof, and the through hole 1311 corresponds to the through hole 1311 in alignment. The through hole 1311 and the through hole 1331 are also coaxial to the second axis B.

The support arm 20 is substantially "T" shaped, and includes a hollow support portion 21 and a connecting portion 23 perpendicularly connected to the support portion 21. The support arm 20 defines a second chamber 25 providing communication between the support portion 21 and the connecting portion 23. The support portion 21 is a substantially rectangular frame, and defines a mounting hole 211 at a middle portion thereof corresponding to the connecting portion 23. Two mounting ends 213 are formed at opposite sides of the mounting hole 211 facing toward the connecting portion 23. A plurality of extending holes 215 are defined through one side of the support portions 21 which is positioned away from the connecting portion 23. The two mounting ends 213 are symmetrically configured relative to the mounting hole 211. The connecting portion 23 is received in the notch 13 and is rotatably connected to the drive arm 10. The connecting portion 23 defines an opening 231 at a side communicating with the second chamber 25.

Figure 5:
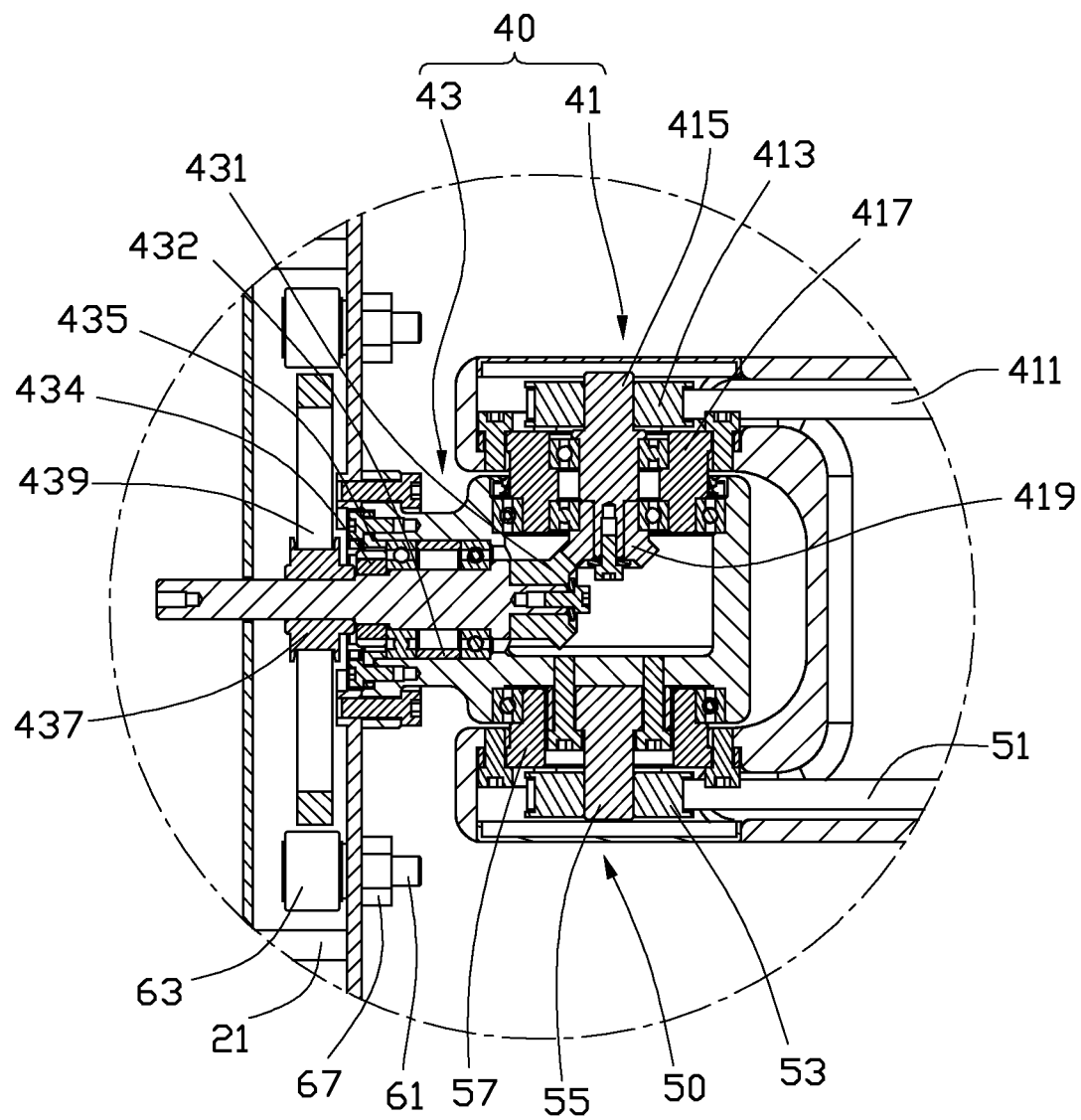
FIG. 5 is an enlarged view of circled portion "V" of FIG. 4.

Also referring to FIG. 5, the three tool portions 30 include a first tool portion 31 rotatably mounted in the mounting hole 211 and two second tool portions 32 (refer to FIG. 3) rotatably mounted to the two mounting ends 213 of the support portion 21 respectively. The first tool portion 31 has a structure similar to that of the second tool portion 32, except that the first tool portion 31 is longer than the second tool portion 32, and includes a block portion 311 formed adjacent to an end thereof, the block portion 311 is received in the connecting portion 23.

The transmission assembly 40 includes a first transmission structure 41 received in the first chamber 11 and a second transmission structure 43 received in the second chamber 25. The first transmission structure 41 is partially received in the opening 231 of the connecting portion 23.

The first transmission structure 41 includes a drive belt 411, a transmission wheel 413, a transmission shaft 415, a transmission sleeve 417 and a first bevel gear 419. The drive belt 411 is received in the first chamber 11 and adjacent to a side of the drive arm 10. One end of the drive belt 411 is sleeved on the transmission wheel 413, and the other end of the drive belt 411 is sleeved to a driver (not labeled). The transmission shaft 415 extends through the first chamber 11 and the opening 231. The transmission wheel 413 is sleeved on a first end of the transmission shaft 415, and received in the first chamber 11. The first bevel gear 419 is sleeved on a second end of the transmission shaft 415 and is received in the opening 231. The transmission sleeve 417 is rotatably sleeved on the transmission shaft 415 via a bearing, and positioned between the transmission wheel 413 and the first bevel gear 419. The transmission sleeve 417 is annular and stepped in shape, wherein an end of the transmission sleeve 417 is fixedly connected to the first pivotal portion 131, and an opposite end of the transmission sleeve 417 is rotatably connected to the connecting portion 23 of the support arm 20.

The second transmission structure 43 includes a second bevel gear 431, a rotation ring 432, a sleeve member 434, a resist member 435, three rotation wheels 437 and a transmission belt 439. The second bevel gear 431, the rotation ring 432, the sleeve member 434 and the resist member 435 are received in the connecting portion 23, the three rotation wheels 437 and the transmission belt 439 are received in the support portion 21. The second bevel gear 431 is sleeved on an end of the first tool portion 31 adjacent to the block portion 311. The axis of the second bevel gear 431 is perpendicular to the axis of the first bevel gear 419, and the second bevel gear 431 engages with the first bevel gear 419. The rotation ring 432 is rotatably sleeved on the middle portion of the first tool portion 31. Two bearings are sleeved on the first tool portion 31, and located at two ends of the rotation ring 432. The sleeve member 434 is substantially annular and defines a plurality of notches (not labeled) around the periphery thereof. The sleeve member 434 is sleeved on the first tool portion 31 away from the block portion 311 adjacent to one of the two bearings. The resist member 435 is sleeved on the sleeve member 434 to enable the two bearings to be contained between the block portion 311 and the resist member 435. An outer edge of the resist member 435 is located on the support portion 21 of the support arm 20. The rotation wheels 437 are sleeved on the first tool portion 31 and the two second tool portions 32, respectively. The transmission belt 439 is sleeved on the three rotation wheels 437. In the embodiment, opposite ends of the transmission belt 439 are sleeved on the two second tool portions 32, and the middle part of the transmission belt 439 is sleeved on the first tool portion 31.

The pivotal assembly 50 is received in the first chamber 11 and connected to the connecting portion 23 of the support arm 20 for rotating the support arm 20. The pivotal assembly 50 includes a rotation belt 51, a rotation wheel 53, a pivotal shaft 55 and a rotation sleeve 57. The rotation belt 51 is received in the first chamber 11 at a side thereof opposite to the drive belt 411, and the two ends of the rotation belt 51 are respectively sleeved on a driver (not labeled) and the rotation wheel 53. The pivotal shaft 55 extends through the though hole 1331 of the second pivotal portion 133 and is connected to a side of the connecting portion 23 opposite to the opening 231. The rotation wheel 53 is sleeved on one end of the pivotal shaft 55 opposite to the connecting portion 23. The rotation sleeve 57 is sleeved on the pivotal shaft 55 and located between the connecting portion 23 and the rotation wheel 53. A first end of the rotation sleeve 57 is rotatably connected to the connecting portion 23 by a bearing, and a second end of the rotation sleeve 57 opposite to the first end thereof is fixedly connected to the second pivotal portion 133.

The two tension assemblies 60 are partially received in the second chamber 25 and located between the two mounting ends 213. Each tension assembly 60 includes a tension shaft 61, a tension wheel 63 and a tension nut 67. The tension shaft 61 extends through the support portion 21, the tension wheel 63 is rotatably sleeved on the tension shaft 61 and subjected to a significant amount of tension by the transmission belt 439. The tension nut 67 is fixedly sleeved on the tension shaft 61 and positioned at the outside of the support portion 21 for connecting the tension shaft 61 with the support portion 21.

In assembly, the two second tool portions 32 are mounted to the two mounting ends 213 of the support portion 21. The second bevel gear 431 is sleeved on the first tool portion 31. The first tool portion 31 extends into the connecting portion 23 until the second bevel gear 431 is received within the opening 231. The rotation ring 432, the sleeve member 434 and the resist member 435 are sleeved on the first tool portion 31 in that order. The resist member 435 is fixed to the connecting portion 23. The connecting portion 23 is partially received in the mounting hole 211 and the first tool portion 31 extends though the corresponding extending hole 215. The connecting portion 23 is connected to the support portion 21, and seals the mounting hole 211. The rotation wheels 437 are sleeved on the first tool portion 31 and the two second tool portions 32. The transmission belt 439 is sleeved on the three rotation wheels 437. The two tension assemblies 60 are mounted on the support portion 21 and the tension wheels 63 resist the transmission belt 439.

The connecting portion 23 is partially received in the notch 13 of the drive arm 10. The pivotal shaft 55 extends through and is fixedly connected to the second pivotal portion 133. The rotation wheel 53 is fixedly sleeved on the pivotal shaft 55. The rotation sleeve 57 is sleeved on the pivotal shaft 55, and located between the connecting portion 23 and the rotation wheel 53. A first end of the rotation sleeve 57 is rotatably connected to the connecting portion 23, and a second end of the rotation sleeve 57 opposite to the first end thereof is fixed to the second pivotal portion 133. The rotation belt 51 is sleeved on the rotation wheel 53.

The transmission sleeve 417 is rotatably sleeved on the transmission shaft 415. The transmission wheel 413 and the first bevel gear 419 are sleeved on opposite ends of the transmission shaft 415. The transmission shaft 415 extends through the first chamber 11 and the opening 231. A first end of the transmission sleeve 417 is fixedly connected to the first pivotal portion 131, and a second end of the transmission sleeve 417 opposite to the first end thereof is rotatably connected to the connecting portion 23. The first bevel gear 419 engages with the second bevel gear 431. The drive belt 411 is sleeved on the transmission wheel 413 to complete the assembly of the robot arm mechanism 100.

In use, the drive arm 10 rotates the support arm 20 about the first axis A, thereby adjusting the position of the three tool portions 30. When the rotation belt 51 drives the rotation wheel 53 to rotate, the rotation wheel 53 then drives the connecting portion 23 to rotate. After that, the connecting portion 23 drives the support arm 20 to rotate around the second axis B, thereby adjusting the height and angle of the three tool portions 30. When the drive belt 411 drives the transmission wheel 413 to rotate around the second axis B, the first bevel gear 419 and the second bevel gear 431 rotate simultaneously. Then the first tool portion 31 rotates around the first axis A and drives the two second tool portions 32 to rotate via the transmission belt 439. Thus, there are three tool portions 30 provided, and each tool portion 30 is capable of working an independent workstation at the same time.

In adopting such small and specific components as, for example, the drive belt 411, the transmission belt 439, the rotation belt 51, the first bevel gear 419 and the second bevel gear 431 for the transmission of power, the repairing of the robot arm mechanism 100 is made much easier. There is a relatively larger amount of space created for repairing the other components inside the robot arm mechanism 100 when the drive belt 411, the transmission belt 439, the rotation belt 51, the first bevel gear 419 are removed. Furthermore, the robot arm mechanism 100 is capable of driving three tool portions 30 to work at the same time, thus achieving real-time multi-tasking.

In one embodiment, the first tool portion 31 is replaced by a rotation shaft which can also function as a drive shaft, and the second bevel gear 431 is sleeved on the rotation shaft.

It should be noted that the number of the second tool portions 32 and the number of the tension assemblies 60 may be changed as needed. The number and layout of the mounting ends 213 may be changed accordingly.

It should be noted that the connecting portion 23 may be located at a side of the second pivotal portion 133 away from the first pivotal portion 131, and the second pivotal portion 133 may be configured for the transmission assembly 40 extending therethrough accordingly.

While various embodiments have been described and illustrated, the disclosure is not to be construed as being restricted thereto. Various modifications can be made to the embodi-

What is claimed is:

1. A robot arm mechanism, comprising:
   a drive arm;
   a support arm rotatably connected to the drive arm;
   a plurality of tool portions rotatably mounted to the support arm, and comprising a first tool portion mounted on the middle portion of the support arm and a plurality of second tool portions mounted on opposite ends of the support arm, the first tool portion comprising a block portion; and
   a transmission assembly comprising:
      a first bevel gear mounted to the drive arm;
      a second bevel gear mounted to the support arm, sleeved on the first tool portion, located adjacent to the block portion, and engaging with the first bevel gear; and
      a transmission belt driven by the second bevel gear and sleeved on the plurality of tool portions for driving the plurality of tool portions to rotate.

2. The robot arm mechanism of claim 1, wherein the drive arm defines a notch at an end thereof, and comprises a first pivotal portion and a second pivotal portion at opposite sides of the notch, the support arm comprises a support portion and a connecting portion perpendicularly connected to the support portion, the connecting portion is received in the notch and rotatably connected to the drive arm.

3. The robot arm mechanism of claim 2, wherein the drive arm defines a first chamber along a longitudinal direction thereof, the support arm defines a second chamber communicating the support portion with the connecting portion, the connecting portion further defines an opening at a side thereof, the second chamber communicates with the first chamber via the opening, the first tool portion and the plurality of second tool portions extend through the support portion and partially received in the second chamber.

4. The robot arm mechanism of claim 3, wherein the transmission assembly further comprises a drive belt and a transmission wheel, the transmission wheel is fixedly sleeved on a transmission shaft, the first bevel gear is fixedly sleeved on the transmission shaft, the drive belt is received in the first chamber of the drive arm, a first end of the drive belt is sleeved on the transmission wheel, and a second end of the drive belt opposite to the first end thereof is sleeved on a driver.

5. The robot arm mechanism of claim 3, wherein the robot arm mechanism further comprises a pivotal assembly, the pivotal assembly comprises a rotation belt, a rotation wheel and a pivotal shaft, the pivotal shaft is fixed to the connecting portion and the rotation wheel is fixedly sleeved on the pivotal shaft, the rotation belt is received in the first chamber, a first end of the rotation belt is sleeved on the rotation wheel, and a second end of the rotation belt opposite to the first end thereof is sleeved on a driver.

6. The robot arm mechanism of claim 2, wherein the support portion defines a mounting hole at the middle portion thereof corresponding to the connecting portion, and comprises a plurality of mounting ends at two sides of the mounting hole, the support portion further defines a plurality of extending holes at a side opposite to the mounting hole, the first tool portion is mounted in the mounting hole, the plurality of second tool portions are mounted on the plurality of mounting ends, the first tool portion and the plurality of second tool portions extend through the plurality of extending holes respectively.

7. The robot arm mechanism of claim 6, wherein the robot arm mechanism further comprises a plurality of tension assemblies mounted on the support portion of the support arm, each of the plurality of tension assemblies is located between two adjacent mounting ends, the plurality of tension assemblies exert an amount of tension by the transmission belt to tightly wind around the first tool portion and the plurality of second tool portions.

8. The robot arm mechanism of claim 7, wherein each of the plurality of tension assemblies comprises a tension shaft, a tension wheel and a tension nut, the tension shaft extends through the support portion, the tension wheel is received in the second chamber and rotatably sleeved on the tension shaft, the tension nut is located outside the support portion and fixedly sleeved on the tension shaft to connect the tension shaft with the support portion, and the tension wheel resists on the transmission belt by the periphery thereof.

9. A robot arm mechanism, comprising:
   a drive arm defining a first chamber along the longitudinal direction thereof;
   a support arm rotatably connected to the drive arm, the support arm defining a second chamber thereof communicating with the first chamber;
   a pivotal assembly comprising a rotation belt and a pivotal shaft, the pivotal shaft being fixed to the support arm, the rotation belt being received in the first chamber, and an end of the rotation belt being sleeved on the pivotal shaft;
   a plurality of tool portions rotatably mounted on the support arm, and comprising a first tool portion mounted on the middle portion of the support arm and a plurality of second tool portions mounted on opposite ends of the support arm, the first tool portion comprising a block portion; and
   a transmission assembly comprising:
      a first transmission subassembly partially received in the first chamber; and
      a second transmission subassembly received in the second chamber and engaging with the first transmission subassembly, the second transmission subassembly comprising a transmission belt sleeved on the plurality of tool portions and a second bevel gear sleeved on the first tool portion and located adjacent to the block portion, the transmission belt being capable of driving the plurality of tool portions to rotate.

10. The robot arm mechanism of claim 9, wherein the drive arm defines a notch communicating with the first chamber at an end thereof, and forming a first pivotal portion and a second pivotal portion at opposite sides of the notch, the support arm comprises a support portion and a connecting portion perpendicularly connected to the support portion, the connecting portion is received in the notch and rotatably connected to the drive arm.

11. The robot arm mechanism of claim 10, wherein the second chamber communicates the support portion with the connecting portion, the connecting portion further defines an opening at a side thereof, the second chamber communicates with the first chamber via the opening, and the first tool portion and the plurality of second tool portions extend through the support portion and partially received in the second chamber.

12. The robot arm mechanism of claim 10, wherein the first transmission subassembly comprises a drive belt, a transmission wheel and a first bevel gear, the drive belt is received in the first chamber of the drive arm, a first end of the drive belt is sleeved on the transmission wheel, a second end of the drive belt opposite to the first end thereof is sleeved on a driver, the transmission wheel is fixedly sleeved on a transmission shaft, the first bevel gear is fixedly sleeved on the transmission shaft, and the first bevel gear engages with the second bevel gear.

13. The robot arm mechanism of claim 10, wherein the pivotal assembly further comprises a rotation wheel, the pivotal shaft is fixed to the connecting portion and the rotation wheel is fixedly sleeved on the pivotal shaft, an end of the rotation belt is sleeved on the rotation wheel.

14. The robot arm mechanism of claim 10, wherein the support portion defines a mounting hole at the middle portion thereof corresponding to the connecting portion and comprises a plurality of mounting ends at two sides of the mounting hole, the support portion further defines a plurality of extending holes at a side of the support portion opposite to the mounting hole, the first tool portion is mounted in the mounting hole, the plurality of second tool portions are mounted on the plurality of mounting ends respectively, the first tool portion and the plurality of second tool portions extend through the plurality of extending holes respectively.

15. The robot arm mechanism of claim 14, wherein the robot arm mechanism further comprises a plurality of tension assemblies mounted on the support portion of the support arm, each of the plurality of tension assemblies is located between two adjacent mounting ends, the plurality of tension assemblies push the transmission belt to tightly wind around the first tool portion and the plurality of second tool portions.

16. The robot arm mechanism of claim 15, wherein each of the plurality of tension assemblies comprises a tension shaft, a tension wheel and a tension nut, the tension shaft extends through the support portion, the tension wheel is received in the second chamber and rotatably sleeved on the tension shaft, the tension nut is located outside the support portion and fixedly sleeved on the tension shaft to connect the tension shaft with the support portion, the tension wheel resists on the transmission belt by the periphery thereof.

* * * * *